United States Patent
Cannon et al.

(10) Patent No.: US 6,338,754 B1
(45) Date of Patent: Jan. 15, 2002

(54) SYNTHETIC GASKET MATERIAL

(75) Inventors: Randy S. Cannon, Provo; Kevin G. Graham, Springville, both of UT (US)

(73) Assignee: US Synthetic Corporation, Orem, UT (US)

( * ) Notice: Subject to any disclaimer, the term of this patent is extended or adjusted under 35 U.S.C. 154(b) by 11 days.

(21) Appl. No.: 09/584,262

(22) Filed: May 31, 2000

(51) Int. Cl.⁷ .......................... C04B 28/26; B28B 3/00
(52) U.S. Cl. ............................. 106/626; 264/333
(58) Field of Search .................. 126/626; 264/333

(56) References Cited

U.S. PATENT DOCUMENTS

| | | | |
|---|---|---|---|
| 3,945,902 A | 3/1976 | Hawrylo et al. ............ 204/192 |
| 4,018,616 A | * 4/1977 | Sugahara et al. .......... 106/626 |
| 4,255,165 A | 3/1981 | Dennis et al. ............... 51/309 |
| 4,278,914 A | 7/1981 | Harper ....................... 315/3.5 |
| 4,295,885 A | 10/1981 | Kaarlela ................... 75/208 R |
| 4,373,410 A | 2/1983 | Davis ........................ 76/108 A |
| 4,381,271 A | 4/1983 | Hayden ...................... 264/29.5 |
| 4,527,998 A | 7/1985 | Knemeyer .................. 51/309 |
| 4,662,896 A | 5/1987 | Dennis ....................... 51/293 |
| 4,681,600 A | 7/1987 | Rhoades et al. ............ 51/293 |
| 4,697,653 A | 10/1987 | Peterson .................... 175/329 |
| 4,736,661 A | 4/1988 | Shirai ......................... 83/882 |
| 4,738,322 A | 4/1988 | Hall et al. .................. 175/329 |
| 4,772,294 A | 9/1988 | Schroeder .................. 51/309 |
| 4,786,670 A | * 11/1988 | Tracy et al. ................ 524/34 |
| 4,797,326 A | 1/1989 | Csillag ....................... 428/552 |
| 4,800,686 A | 1/1989 | Hirabayashi et al. ..... 51/283 R |
| 4,802,539 A | 2/1989 | Hall et al. .................. 175/329 |
| 4,850,523 A | 7/1989 | Slutz .......................... 228/121 |
| 4,858,707 A | 8/1989 | Jones et al. ................ 175/329 |
| 4,863,881 A | 9/1989 | Ahrens et al. .............. 501/92 |
| 4,899,922 A | 2/1990 | Slutz et al. ................. 228/121 |
| 4,925,701 A | 5/1990 | Jansen et al. .............. 427/38 |
| 4,931,068 A | 6/1990 | Dismukes et al. .......... 51/293 |
| 4,943,488 A | 7/1990 | Sung et al. ................ 428/552 |
| 4,944,772 A | 7/1990 | Cho ............................ 51/293 |
| 4,991,467 A | 2/1991 | Packer ..................... 76/108.6 |
| 5,009,673 A | 4/1991 | Cho ............................ 51/293 |
| 5,030,276 A | 7/1991 | Sung et al. ................. 75/237 |
| 5,056,382 A | 10/1991 | Clench ..................... 76/108.2 |
| 5,080,752 A | 1/1992 | Kabacoff et al. .......... 156/603 |
| 5,082,070 A | 1/1992 | Obermeier et al. ........ 175/403 |
| 5,101,692 A | 4/1992 | Simpson ................... 76/108.2 |
| 5,115,697 A | 5/1992 | Rodriguiz et al. ........ 76/108.6 |
| 5,116,568 A | 5/1992 | Sung et al. ................. 419/11 |
| 5,126,207 A | 6/1992 | Chen et al. ................ 428/408 |
| 5,129,918 A | 7/1992 | Chattopadhay ............ 51/295 |
| 5,130,111 A | 7/1992 | Pryor ......................... 423/446 |
| 5,135,808 A | 8/1992 | Kimock et al. ............ 428/336 |
| 5,173,089 A | 12/1992 | Tanabe et al. ............. 51/293 |
| 5,190,807 A | 3/1993 | Kimock et al. ............ 428/216 |
| 5,206,083 A | 4/1993 | Rai et al. ................... 428/323 |
| 5,224,969 A | 7/1993 | Chen et al. ................. 51/295 |
| 5,268,217 A | 12/1993 | Kimock et al. ............ 428/216 |
| 5,271,696 A | 12/1993 | Sock ......................... 408/144 |

(List continued on next page.)

Primary Examiner—David Brunsman
(74) Attorney, Agent, or Firm—Lloyd W. Sadler

(57) ABSTRACT

A synthetic gasket material and the method for make such is described. This invention is specifically adapted for use in high-pressure, high-temperature presses. This material is made from a compacted, granulated and dried mixture of talc, garnet, and sodium silicate. This composition provides an alternative to the use of natural pyrophyllite as the material for gasket components, thereby reducing the cost of the materials. This composition can be pressed to net or near net geometry, thereby generating less waste. Moreover, this composition provides more consistency for the gasket components. Furthermore, this material has improved thermal insulator properties, thereby leading to lower power consumption used in the high-pressure, high-temperature presses.

13 Claims, 1 Drawing Sheet

U.S. PATENT DOCUMENTS

| | | | |
|---|---|---|---|
| 5,298,286 A | 3/1994 | Yang et al. | 427/249 |
| 5,300,188 A | 4/1994 | Tessmer et al. | 156/636 |
| 5,352,493 A | 10/1994 | Dorfman et al. | 427/530 |
| 5,354,717 A | 10/1994 | Pollock et al. | 437/225 |
| 5,388,484 A | 2/1995 | Bogner | 76/108.2 |
| 5,405,573 A | 4/1995 | Clark et al. | 419/35 |
| 5,443,337 A | 8/1995 | Katayama | 408/145 |
| 5,443,861 A | 8/1995 | Huhne | 427/249 |
| 5,449,531 A | 9/1995 | Zhu et al. | 427/240 |
| 5,462,772 A | 10/1995 | Lemelson | 427/554 |
| 5,466,431 A | 11/1995 | Dorman et al. | 423/446 |
| 5,467,675 A | 11/1995 | Dow et al. | 82/1.11 |
| 5,483,920 A | 1/1996 | Pryor | 117/106 |
| 5,486,951 A | 1/1996 | Hamblen | 359/565 |
| 5,487,945 A | 1/1996 | Yang et al. | 428/408 |
| 5,488,350 A | 1/1996 | Aslam et al. | 338/225 D |
| 5,500,248 A | 3/1996 | Iacovangelo et al. | 427/250 |
| 5,505,884 A | 4/1996 | Burke et al. | 264/1.1 |
| 5,511,718 A | 4/1996 | Lowder et al. | 228/103 |
| 5,516,500 A | 5/1996 | Liu et al. | 423/446 |
| 5,519,069 A | 5/1996 | Burke et al. | 523/106 |
| 5,529,805 A | 6/1996 | Iacovangelo et al. | 427/249 |
| 5,545,030 A | 8/1996 | Pinneo | 428/408 |
| 5,554,415 A | 9/1996 | Turchan et al. | 427/248.1 |
| 5,567,532 A | 10/1996 | Peker et al. | 428/457 |
| 5,571,615 A | 11/1996 | Phillips et al. | 428/336 |
| 5,571,616 A | 11/1996 | Phillips et al. | 428/336 |
| 5,584,045 A | 12/1996 | Tanabe et al. | 428/547 |
| 5,590,729 A | 1/1997 | Cooley et al. | 175/432 |
| 5,609,955 A | 3/1997 | Pinneo | 428/323 |
| 5,620,754 A | 4/1997 | Turchan et al. | 427/554 |
| 5,633,088 A | 5/1997 | Pinneo | 428/408 |
| 5,637,388 A | 6/1997 | White et al. | 428/109 |
| 5,643,641 A | 7/1997 | Turchan et al. | 427/595 |
| 5,647,878 A | 7/1997 | Iacovangelo et al. | 51/295 |
| 5,648,127 A | 7/1997 | Turchan et al. | 427/596 |
| 5,652,436 A | 7/1997 | Stoner et al. | 257/77 |
| 5,653,952 A | 8/1997 | Suzuki et al. | 423/446 |
| 5,657,138 A | 8/1997 | Lewis et al. | 359/15 |
| 5,669,944 A | 9/1997 | Cerutti et al. | 51/309 |
| 5,672,240 A | 9/1997 | Stoner et al. | 156/631.1 |
| 5,685,671 A | 11/1997 | Packer et al. | 407/54 |
| 5,700,518 A | 12/1997 | Lee et al. | 427/249 |
| 5,707,717 A | 1/1998 | Shibahara et al. | 428/217 |
| 5,731,046 A | 3/1998 | Mistry et al. | 427/553 |
| 5,783,316 A | 7/1998 | Colella et al. | 428/660 |
| 5,803,967 A | 9/1998 | Plano et al. | 117/102 |
| 5,849,413 A | 12/1998 | Zhu et al. | 428/408 |
| 5,858,525 A * | 1/1999 | Carter et al. | 428/325 |
| 5,871,060 A | 2/1999 | Jensen et al. | 175/420.2 |
| 5,888,846 A | 3/1999 | Miyata et al. | 438/105 |
| 5,900,225 A | 5/1999 | Mistry et al. | 423/446 |
| 5,900,301 A | 5/1999 | Brandes et al. | 428/77 |
| 5,902,675 A | 5/1999 | Pinneo | 428/323 |
| 5,903,386 A | 5/1999 | Mantravadi et al. | 359/366 |

* cited by examiner

SYNTHETIC GASKET MATERIAL

BACKGROUND OF THE INVENTION

1. Field of the Invention

This invention relates to materials suitable for use in high-pressure, high-temperature presses. More specifically, this invention relates to materials suitable for use as a gasket or other pressure transmitting medium.

2. Description of Related Art

A variety of synthetic gasket materials have been proposed, however use of garnet in gasket materials has not been suggested in prior gasket materials.

The reader is referred to the following U.S. patent documents for general background material. Each of these patents is hereby incorporated by reference in its entirety for the material contained therein.

U.S. Pat. No. 4,124,562 describes a filled polyolefin composition based upon a polyolefin resin filled with a mechanico-chemically modified filler.

U.S. Pat. No. 4,786,670 describes a non-asbestos compressible sheet material usable for high-temperature gaskets preferably containing 10–50% by weight of an inorganic fibrous material, 10–90% by weight of an inorganic filler material, 4–30% by weight of an organic elastomeric binder, 2–10% by weight of an inorganic silicate binder and 1.0–10% of an organic fibrous material.

U.S. Pat. No. 4,861,076 describes a sanitary pipe fitting and gasket for use in such fitting.

U.S. Pat. No. 4,927,290 describes a manhole cover support resistant to infiltration of surface water.

U.S. Pat. Nos. 4,946,737 and 5,132,061 describe a gasket composition, which contains microspheres, which expand inside the gasket, sheet material after the gasket sheet is formed.

U.S. Pat. No. 5,416,149 describes a pulp-like composite material free from the problems possessed by wood pulp that may be used as a possible substitute for asbestos and a process for production thereof.

U.S. Pat. No. 5,615,897 describes a gasket material that includes a sheet metal having a coating of adhesive applied thereon.

U.S. Pat. No. 5,709,956 describes an extruded product that comprises a rigid portion and a flexible portion, which are co-extruded, wherein the rigid portion is made of a resin or resin composition having a deflection temperature under load of from 80° to 120° C. as measured by JIS K 7207 A—method, and the flexible portion is made of a resin composition that comprises form 5 to 75% by weight of a vinyl chloride resin, from 5 to 70% by weight of a partially crosslinked acrylonitrile-butadiene copolymer and from 10 to 65% by weight of a plasticizer.

U.S. Pat. No. 5,731,040 describes a method for manufacturing gasket material where a metal plate is coated with a compound that includes a compressible inorganic fiber, other than asbestos, a compressible organic fiber, and rubber and an inorganic filler.

U.S. Pat. No. 5,858,525 describes a synthetic gasket material for use in a high-pressure press that includes a major proportion of clay material powder having sufficient lubricity to flow in a high-pressure press.

SUMMARY OF THE INVENTION

It is desirable to provide a synthetic gasket material for use in high-pressure, high-temperature presses. Moreover, it is desirable to provide a synthetic gasket material, which provides an alternative to the use of natural pyrophyllite materials. In particular it is desirable to provide a synthetic gasket material, which uses garnet as a hard/abrasive material to retard the flow of the talc material.

Therefore, it is an object of this invention to provide a synthetic gasket material for use in high-pressure, high-temperature presses, which uses garnet to retard the flow of the talc.

It is a further object of this invention to provide a synthetic gasket material for use in high-pressure, high-temperature presses, which reduces the materials cost of the material.

It is another object of this invention to provide a synthetic gasket material for use in high-pressure, high-temperature presses, which generates less waste in the pressing process.

It is a still further object of this invention to provide a synthetic gasket material for use in high-pressure, high-temperature presses, which provides enhanced composition consistency.

Another object of this invention is to provide a synthetic gasket material for use in high-pressure, high-temperature presses, which provides improved thermal insulation properties.

A still further object of this invention is to provide a synthetic gasket material for use in high-pressure, high-temperature presses, which reduces, required power consumption during high-temperature, high-pressure press operations.

It is a further object of this invention to provide a synthetic gasket material for use in high-pressure, high-temperature press operations.

Another object of this invention is to provide a synthetic gasket material for use in high-pressure, high-temperature presses that contributes to longer life of tooling used in the press.

A still further object of this invention to provide a synthetic gasket material for use in high-pressure, high-temperature presses, which is compatible with a variety of presses, including cubic, and belt presses.

These and other objects of this invention are achieved by the method and composition herein described and are readily apparent to those of ordinary skill in the art upon careful review of the following drawings, detailed description and claims.

BRIEF DESCRIPTION OF THE DRAWINGS

In order to show the manner that the above recited and other advantages and objects of the invention are obtained, a more particular description of the preferred embodiments of this invention, which is illustrated in the appended drawing, is described as follows. The reader should understand that the drawing depicts only a preferred embodiment of the invention, and are not to be considered as limiting in scope. A brief description of the drawings is as follows.

DETAILED DESCRIPTION OF THE INVENTION

Figure 1:
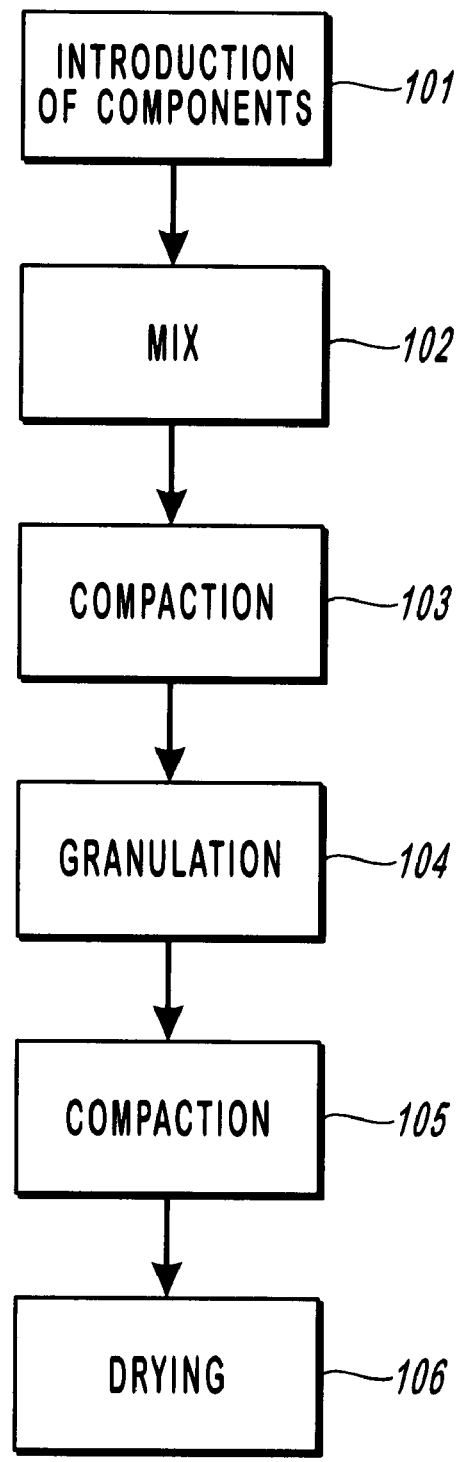
FIG. 1 is a flow chart showing the preferred method of making the composition of this invention.

For the purpose of this disclosure the term gasket is defined to be any pressure transmitting medium or packing used between matched machine parts. This invention is a material useful for making synthetic gaskets, and the method of making the same. The synthetic gasket material of this invention is particularly adapted for use in high-pressure, high-temperature presses. This invention is made by combining talc powder, garnet powder and sodium silicate solution into a homogeneous mixture. Typically, the gaskets of this invention are formed during a press/sinter step of a diamond/carbide compact manufacturing process when the material extrudes between the press anvils, sealing the pyrophyllite cube, thereby allowing internal pressure to develop on the cube and its internal components. The gasket material is compacted and milled to form a coarse, granular, free-flowing powder. The granular powder is then compacted to form the desired gasket components with net or near net geometry, and then is baked to remove excess moisture. This process is described in further detail following. The sodium silicate is used as a binder that allows the mixture to be compacted to form the desired gasket components. Talc provides the lubricity necessary to give the gasket the ability to flow between the carbide tooling of a high-pressure, high-temperature press. Garnet provides the hardness/abrasiveness necessary to retard the flow of the talc, so that the pressure seal can be formed between the carbide tooling of the high-pressure, high-temperature press, and induces the abrasive grip to limit flow after the proper gasket development. The preferred talc and garnet are introduced into the mixture in powder form, preferably with a mean particle size of 10–12 microns and with 95% of all particles smaller than 325 mesh (U.S. Standard). Particle sizes in this range provide a high degree of homogeneity in the mixture. The preferred sodium silicate solution has a specific gravity of 1.435 g/cc (44° Baume'), with a $SiO_2/NaO_2$ ratio of 2.40 and a solids content of 39.8%.

FIG. 1 shows the process of this invention. First the component raw materials, as described above, are introduced 101 in to a mixture. Preferably, in its best mode of the invention, the homogeneous mixture is formed by mixing, by weight 63.5% talc powder, 20.8% garnet powder and 15.7% sodium silicate solution. These materials, have a combined moisture content of 9.5%. During the mixing step, the moisture content is reduced due to the heat generated in the mixture by the mixer. The extent of this moisture reduction can be controlled by the total mixing time of the raw materials. The desired target moisture level is in the range of 6.75% to 7.00%. This is the optimum moisture level for the next step. The mixture is next compacted 103 and then granulated 104. Compaction 103 and granulation 104 converts the homogeneous mixture into a suitable form for the powder compaction process to form the gasket components. Compaction 103 and granulation 104 of the mixture is preferably accomplished with the use of a roll-compactor, mill and screener. The mixture is compacted 103 into a dense sheet between counter-rotating rolls. This dense sheet is milled (or granulated) 104 to form coarse particle sizes. The target particle size of the granulated powder is 16–60 mesh (U.S. Standard), though a small percentage of 'fines' is acceptable (typically and preferably up to 12%). The preferred minimum loose bulk density of the material is 1.25 g/cc. Generally, if the loose bulk density is less than 1.25 g/cc, it is difficult to obtain acceptable density during the powder compaction stage of the process. The gasket components are formed from the granulated mixture in a powder compaction press. Typically and preferably, the components are formed with net or near net geometry and are pressed to a minimum of 2.57 g/cc (96% of theoretical density). After granulation 104 a second compaction step 105 may be performed. The design of the powder compaction tooling should take into account the expansion of the components after pressing and shrinkage, due to the baking of the drying step 106, described as follows. The resulting gasket components are dried 106, using an appropriate baking cycle. Most of the moisture is removed at a temperature of between 205° and 210° F. Generally, higher initial temperatures will cause rapid expansion of the moisture, which can cause cracks of the components. A slow ramp-up to the initial temperature is preferred to avoid cracking. The degree of ramp-up depends on the cross-section of the gasket component. A gasket component with a thicker cross-section requires a slower ramp-up. After a sufficient soak time at 205° to 210° F. additional moisture can be removed at still higher temperature. Provided sufficient final soak times, the final moisture content of the components can generally be controlled by the final soak temperature. The final moisture content of the synthetic gasket components is an important in that it affects the flow properties of the components. Drier components will typically be "stiffer" or more resistant to flow. Acceptable properties have been obtained with moisture contents ranging from 0 to 0.85%. However, to maximize part-to-part consistency, the moisture content of the components should be controlled to +/−10%. After manufacture, the components are stored in double bags to maintain moisture control.

The described embodiments of this invention are to be considered in all respects only as illustrative and not as restrictive. The scope of this invention is indicated by the appended claims rather than by the foregoing description. All changes, which come within the meaning and range of equivalency of, the claims are to be embraced as being within their scope.

We claim:

1. A composition for use in making synthetic gaskets, comprising:
   (A) a portion of talc;
   (B) a portion of garnet; and
   (C) a portion of sodium silicate.

2. A composition for use in making synthetic gaskets, as recited in claim 1, wherein said portion of talc is between 30% and 90% by weight of the composition.

3. A composition for use in making synthetic gaskets, as recited in claim 1, wherein said portion of garnet is between 10% and 30% by weight of the composition.

4. A composition for use in making synthetic gaskets, as recited in claim 1, wherein said portion of sodium silicate is between 5% and 25% by weight of the composition.

5. A composition for use in making synthetic gaskets, as recited in claim 1, wherein said portion of talc has a median particle size of between 10 and 12 microns.

6. A composition for use in making synthetic gaskets, as recited in claim 1, wherein said portion of garnet has a median particle size of between 10 and 12 microns.

7. A process for making a synthetic gasket material, comprising:
   (A) introducing a portion of talc, a portion of garnet, and a portion of sodium silicate into a common vessel;
   (B) mixing said portion of talc, said portion of garnet, and said sodium silicate into a mixture;
   (C) compacting said mixture into a dense sheet;
   (D) granulating said dense sheet into a powder;
   (E) compacting said powder into a desired component geometry; and
   (F) drying said compacted powder to remove excess moisture.

8. A process for making a synthetic gasket material, as recited in claim 7, further comprising pressing said granulated powder into a gasket component.

9. A process for making a synthetic gasket material, as recited in claim 7, wherein said mixing further comprises reducing the moisture content of said mixture.

10. A process for making a synthetic gasket material, as recited in claim 7, wherein said compacting is performed using a roll-compactor.

11. A process for making a synthetic gasket material, as recited in claim 7, wherein said granulating is performed using a mill.

12. A process for making a synthetic gasket material, as recited in claim 7, wherein said drying said powder removes the moisture content of the material to a range between 0% and 0.85% by weight.

13. A process for making a synthetic gasket material, comprising:
- (A) introducing a portion of talc, a portion of garnet, and a portion of sodium silicate into a common vessel;
- (B) mixing said portion of talc, said portion of garnet, and said sodium silicate into a mixture;
- (C) agglomerating said mixture to create a powder;
- (D) compacting said powder into a desired component geometry; and
- (E) drying said compacted powder to remove excess moisture.

\* \* \* \* \*